(12) United States Patent
Shen et al.

(10) Patent No.: US 8,644,809 B2
(45) Date of Patent: Feb. 4, 2014

(54) SYSTEM AND METHOD OF TRANSMITTING ELECTRONIC VOUCHER THROUGH SHORT MESSAGE

(75) Inventors: Wei Shen, Beijing (CN); Jia Bing Liu, Beijing (CN); Xiao Wei Guo, Beijing (CN); Si Ping Wang, Beijing (CN); Feng Ai, Beijing (CN); Li Duo Zhong, Beijing (CN)

(73) Assignees: GMedia Technology (Beijing) Co. Ltd., Beijing (CN); Beijing Sigone Venture Limited, Beijing (CN)

( * ) Notice: Subject to any disclaimer, the term of this patent is extended or adjusted under 35 U.S.C. 154(b) by 196 days.

(21) Appl. No.: 13/130,422

(22) PCT Filed: Nov. 20, 2009

(86) PCT No.: PCT/CN2009/001288
§ 371 (c)(1),
(2), (4) Date: May 20, 2011

(87) PCT Pub. No.: WO2010/057366
PCT Pub. Date: May 27, 2010

(65) Prior Publication Data
US 2011/0230218 A1    Sep. 22, 2011

(30) Foreign Application Priority Data
Nov. 20, 2008    (CN) .......................... 2008 1 0226701

(51) Int. Cl.
*H04L 29/08*    (2006.01)
*H04W 4/00*    (2009.01)
*H03M 7/00*    (2006.01)
*H03M 5/00*    (2006.01)

(52) U.S. Cl.
USPC ............. 455/414.4; 455/466; 341/90; 341/52

(58) Field of Classification Search
USPC ............. 455/466, 414.1, 414.2, 414.3, 414.4; 341/50, 51, 90
See application file for complete search history.

(56) References Cited

U.S. PATENT DOCUMENTS

| | | | | |
|---|---|---|---|---|
| 5,272,765 A | * | 12/1993 | Tanaka et al. | 382/181 |
| 5,331,431 A | * | 7/1994 | Jasinski | 358/462 |
| 5,805,710 A | * | 9/1998 | Higgins et al. | 382/101 |

(Continued)

FOREIGN PATENT DOCUMENTS

| | | |
|---|---|---|
| CN | 1379307 A | 11/2002 |
| CN | 1950853 A | 4/2007 |
| CN | 101309446 A | 11/2008 |

*Primary Examiner* — Christopher M Brandt
(74) *Attorney, Agent, or Firm* — Laurence A. Greenberg; Werner H. Stemer; Ralph E. Locher

(57) ABSTRACT

A system and method of transmitting electronic voucher through short message. The method of transmitting an electronic voucher through a short message includes converting an electronic voucher to be transmitted into a bit stream; mapping each n-bits of the bit stream to any one text character of one of a plurality of text character groups, wherein text characters in each of the text character groups have at least one same or similar feature, and bit number n corresponding to each text character depends on the number m of the text character groups; arranging the text characters obtained through the mapping into a character sequence; and transmitting the character sequence through a short message. The present invention greatly reduces the cost for issuing an electronic voucher, significantly increases the convenience and apparently improves the safety and the stability.

19 Claims, 5 Drawing Sheets

| Character group | Binary bit group | geometry and image feature | Exemplary character |
|---|---|---|---|
| Group 1 | 000 | longitudinal symmetry, and lateral symmetry | HIOXox |
| Group 2 | 001 | longitudinal symmetry, but no lateral symmetry | BCDE |
| Group 3 | 010 | lateral symmetry, but no longitudinal symmetry, the number of dark spots in upper region is greater than the number of dark spots in lower region | TVYv |
| Group 4 | 011 | lateral symmetry, but no longitudinal symmetry, the rest | AMUWimnw |
| Group 5 | 100 | no longitudinal symmetry and no lateral symmetry, the number of dark spots in upper region is greater than the number of dark spots in lower region | FPr |
| Group 6 | 101 | no longitudinal symmetry and no lateral symmetry, the number of dark spots in lower region is greater than the number of dark spots in upper region | JLQbdgjy |
| Group 7 | 110 | no longitudinal symmetry and no lateral symmetry, but with same vertical mirror image and horizontal mirror image | NSZsz |
| Group 8 | 111 | the rest | rest characters |

(56) References Cited

U.S. PATENT DOCUMENTS

| | | | |
|---|---|---|---|
| 5,852,685 A * | 12/1998 | Shepard | 382/311 |
| 6,212,299 B1 * | 4/2001 | Yuge | 382/231 |
| 6,269,171 B1 * | 7/2001 | Gozzo et al. | 382/101 |
| 7,522,075 B2 | 4/2009 | Mak | |
| 8,121,896 B1 * | 2/2012 | Lagassey | 705/14.4 |
| 2003/0084109 A1 * | 5/2003 | Balluff | 709/206 |
| 2004/0017944 A1 * | 1/2004 | Ding et al. | 382/182 |
| 2004/0197018 A1 * | 10/2004 | Schultz | 382/128 |
| 2005/0057779 A1 * | 3/2005 | Sesek et al. | 358/400 |
| 2005/0226517 A1 * | 10/2005 | Kimura et al. | 382/243 |
| 2006/0255143 A1 * | 11/2006 | Ehrhart | 235/454 |
| 2007/0189628 A1 * | 8/2007 | Nolan et al. | 382/254 |
| 2007/0216950 A1 * | 9/2007 | Yamakado et al. | 358/1.18 |
| 2007/0258661 A1 * | 11/2007 | Koshi et al. | 382/298 |
| 2008/0131073 A1 * | 6/2008 | Ogawa et al. | 386/52 |
| 2008/0191909 A1 * | 8/2008 | Mak | 341/95 |
| 2008/0199081 A1 * | 8/2008 | Kimura et al. | 382/190 |
| 2008/0244378 A1 * | 10/2008 | Chen et al. | 715/226 |
| 2009/0097756 A1 * | 4/2009 | Kato | 382/190 |
| 2009/0292540 A1 * | 11/2009 | Liu et al. | 704/251 |
| 2010/0114562 A1 * | 5/2010 | Hutchinson et al. | 704/9 |
| 2010/0131532 A1 * | 5/2010 | Schultz | 707/758 |

\* cited by examiner

| Character group | Binary bit group | geometry and image feature | Exemplary character |
|---|---|---|---|
| Group 1 | 000 | longitudinal symmetry, and lateral symmetry | HIOXox |
| Group 2 | 001 | longitudinal symmetry, but no lateral symmetry | BCDE |
| Group 3 | 010 | lateral symmetry, but no longitudinal symmetry, the number of dark spots in upper region is greater than the number of dark spots in lower region | TVYv |
| Group 4 | 011 | lateral symmetry, but no longitudinal symmetry, the rest | AMUWimnw |
| Group 5 | 100 | no longitudinal symmetry and no lateral symmetry, the number of dark spots in upper region is greater than the number of dark spots in lower region | FPr |
| Group 6 | 101 | no longitudinal symmetry and no lateral symmetry, the number of dark spots in lower region is greater than the number of dark spots in upper region | JLQbdgjy |
| Group 7 | 110 | no longitudinal symmetry and no lateral symmetry, but with same vertical mirror image and horizontal mirror image | NSZsz |
| Group 8 | 111 | the rest | rest characters |

```
Restaurant
Coupon 20% off
H N B O ●
F G X P K
I T A M C
● S D Z ●
No. 123456789
Addr. XXX
Tel. XXX
```
602

```
H W C N F U X
Y O O Z D T E
Y N V N K L
```
603

```
= H W C N F U
  X Y O O Z D T
  Y N K L =
```
604

```
◎ H W C N ◎
◎ Y O O Z ◎
◎ D T Y N ◎
◎ L I U A ◎
```
605

```
  H N B O X
  F G X P K
  I T A M C
  A S D Z G
```
606

SYSTEM AND METHOD OF TRANSMITTING ELECTRONIC VOUCHER THROUGH SHORT MESSAGE

TECHNICAL FIELD

The present invention generally relates to the field of communication, and more particularly, to a system and a method of transmitting an electronic voucher through a short message.

BACKGROUND

Electronic vouchers are widely employed in the fields of electronic ID recognition and electronic payment voucher. By making traditional vouchers electronic, the cost of vouchers is reduced, the safety of vouchers is enhanced, and electronic commerce is provided with electronic voucher means. The major businesses forms of the voucher means include electronic tickets (such as performance admission tickets, sport event tickets, film tickets, sight spot admission tickets, train and ship tickets, air tickets etc.), electronic coupons, electronic delivery coupons, electronic membership cards, electronic ID cards and the like.

A typical electronic voucher business is electronic coupon. In the business of electronic coupon, a user acquires an electronic coupon by ways such as Internet, call center. The user can download and print an electronic coupon via an Internet website, and can also submit a mobile telephone number to a website, so as to facilitate the website to issue an electronic coupon via, such as, a multimedia message of the mobile telephone. A user may dial the telephone number of a call center and the call center may push an electronic coupon to the user as requested. The user may show the electronic coupon received by his mobile telephone to a merchant. After recognizing and reading processing by the merchant' electronic voucher terminal, the user may use the electronic coupon to enjoy discount and favorable price.

A typical way to issue an electronic voucher is by multimedia message, i.e., issuing an image format, optically readable electronic voucher through a multimedia message. When a user uses the electronic voucher, he needs to show the multimedia message to a merchant, so as to facilitate the user or the merchant to recognize and verify the electronic voucher on an optical recognition terminal.

Another typical way to issue an electronic voucher is by short message, i.e., issuing the voucher number of an electronic voucher to a user's mobile terminal through a short message. When the user uses the electronic voucher, he needs to show the short message to a merchant, so as to facilitate the user or the merchant to input the voucher number of the electronic voucher into a voucher verification/recycling terminal. A short message with WAP PUSH format may also be issued through WAP PUSH, upon opening the short message and clicking the URL of the short message, the user then may download actively an image including an electronic voucher.

A further typical way to issue an electronic voucher is by enhanced short message, i.e., issuing an electronic image format, optically readable voucher through an enhanced short message. When a user uses the electronic voucher, he needs to show the multimedia message to a merchant, so as to facilitate the user or the merchant to recognize and verify the electronic voucher on an optical recognition terminal.

All current mainstream embodiments of electronic voucher have diverse problems respectively, which restrict the development of electronic voucher businesses:

1. The way of downloading an electronic voucher and printing it into a paper voucher via Internet has high requirements of users' operating environment (need a printer), and the printed paper voucher is not easy to be preserved and may be easily duplicated, so that security concern exists.

2. The way of issuing an electronic voucher through a multimedia message is facing more extensive problems, including:

the cost of issuing a multimedia message is higher, which has formed a serious obstacle to a voucher businesses with a larger business capacity;

the cognitive level of users to multimedia message is low (Many users are unable to use multimedia message service);

not all users' terminals support multimedia message service;

the accessible rate of an issued multimedia message is low; and a multimedia message needs to be adapted in terms of the size and resolution of a user's mobile terminal, whereas the information of the terminal belongs to the user's privacy and is not easy to obtain (one may not achieve the information of the user's mobile terminal unless supported by its operator) and so on.

3. The way of issuing the number of an electronic voucher through a short message encounters input trouble. For safety concerns, the number of an electronic voucher is generally long, which frequently causes input error while inputting the number of an electronic voucher.

4. In the way of issuing an electronic voucher by an enhanced short message, as the size of an image which is allowed to be transmitted by the enhanced short message is too small, a common code scanning gun or reading apparatus is unable to recognize the electronic voucher. It must be recognized by a specially designed device. On the other hand, an enhanced short message also must be adapted for the brand and the type of a mobile terminal, whereas the information of the terminal belongs to the user's privacy and is not easy to obtain (one may not achieve the information of the user's mobile terminal unless supported by its operator).

If an electronic voucher business can be realized though a short message and an electronic voucher can be automatically recognized by a recognition terminal, not only the problems that Internet and multimedia message electronic voucher business faces can be well resolved, but also the problem of input error while sending the number of the electronic voucher can be resolved. Short message business/services is one of the mobile businesses which are widely accepted by users, almost all of mobile terminals support short message services. The cost of short message service is low, the accessible rate of issuing is high, and the adaptation in terms of the brand and type of a mobile terminal is not needed. As short message can only issue text characters, generally optical reading of the text character requires OCR (optical character recognition) technique. Because the high computational load of OCR technique, both the recognition ratio and recognition speed is not acceptable, especially on the mobile terminal or embedded equipment with lower CPU frequency and small memory.

The basic principle of optical character recognition is comparing a "character" separated from the image with the standard samples in template library, and judging the character which the "character" belong to according to the matching degree. The bigger the number of standard samples in template library is, the heavier the CPU computational load required by the comparison algorithm will be. This causes the speed of recognition be reduced. At the same time, the bigger the number of standard samples in template library is, the higher the ratio of wrong matching will be. The solution of the present invention is to categorize a character set based on features for reducing the number of standard samples in a template library, and thus reducing the CPU computational load and improving the speed and success ratio of recognition. Take the character set GB2312 (there are 7445 characters in this character set) as an example, if the 7445 characters are classified into 16 categories in the term of features, the number of standard samples in a template library is reduced from 7445 to 16, and the computational load of sample comparison is approximately reduced to 16/7445=0.2% of that when using the whole character set, so as to dramatically reduce the CPU computation amount, and improve the speed and success ratio of recognition. Meanwhile, when the number of samples is reduced, a simpler, lower computational load comparison algorithm could be adopted. The success ratio of recognition is also improved, while reducing the computational load. The following features belong to simple comparison features: axial symmetry and rotational symmetry of the text characters, number or proportion of dark spots, dispersion of dark spots, number of lines, type of lines, projection histogram features in x axis and y axis, frequency domain features in x axis or y axis, and type or number or position of cross points of lines, and so on. In addition, eliminating some characters (such as "I" and "1"; "O" and "0"; and "吴" and "昊") subjected to misidentifying simplifies the comparison algorithm significantly, and improves the speed and success ratio of recognition.

Another feature of the present invention is to improve the safety of an electronic voucher through "many to one" mapping method between characters and bit groups. When many characters could be mapped to same code information, it will significantly improve the difficulty of deciphering, and conjecturing the context of the electronic voucher and the way of coding, so as to enhance the security of electronic voucher business.

SUMMARY OF INVENTION

It is an object of the present invention to issue character type, optically readable electronic voucher through short message, which is a mature, widely-used, low cost communication method, to implement the electronic voucher business/service.

The solution of the present invention is dividing text characters into m groups in terms of their geometry or image features, and m is not less than 2. When these text characters are read by an optical apparatus, they are decoded to different code information (bit groups) according to the categories to which the text characters belong. This method of dividing the character set to character groups will significantly reduce the CPU computational load and memory consumption when the characters are recognized, so it is more suitable to implement optical reading on a mobile terminal.

According to one aspect of the present invention, a method of transmitting an electronic voucher through a short message is provided, which comprises: converting an electronic voucher to be transmitted into a bit stream; mapping each n-bits of the bit stream to any one text character of one of a plurality of text character groups, wherein text characters in each of the text character groups have at least one same or similar feature, and bit number n corresponding to each text character depends on the number m of the text character groups; arranging the text characters obtained through the mapping into a character sequence; and transmitting the character sequence through a short message. The method may further comprises, before the operation of mapping, forming a code word stream after encoding and adding an error correcting code stream to the bit stream. Moreover, the method may comprises adding at least one locator character and at least one control character to the text character sequence, and adding at least one linefeed character to arrange the text character sequence into a text character code pattern, and then transmitting the text character code pattern through a short message.

According to yet another aspect of the present invention, a method of acquiring an electronic voucher through a short message is provided, which comprises: receiving a text character sequence through a short message; recognizing features of text characters in the text character sequence in an optical manner, and determining to which one of a plurality of text character groups each text character belongs based on at least one feature of each text character, wherein text characters in each of the text character groups have at least one same or similar feature; mapping each text character to bits or a bit group corresponding to the text character group determined to form a bit stream; and decoding the bit stream to acquire the content of the electronic voucher. The method may further comprises at least one locator character, at least one control character and at least one linefeed character, and the text character sequence is displayed in the form of a text character code pattern.

According to the present invention, the text characters in each of the text character groups have at least one same or similar geometry or image feature. The text character groups are formed by grouping of GB2312 codes, ASCII codes, numerals and English alphabets or full-width English alphabets in terms of their geometry or image features.

According to the present invention, the method may further comprise dividing a text character set into m text character groups in terms of the geometry or image features of the text characters of the text character set, and wherein m is not less than 2. According to an embodiment of the present invention, a criterion of dividing the text character set in terms of the geometry or image features of the text characters of the text character set may comprise axial symmetry and rotational symmetry of the text characters. According to another embodiment of the present invention, a criterion of dividing the text character set in terms of the geometry or image features of text characters of the text character set may comprise: number or proportion of dark spots, dispersion of dark spots, number of lines, type of lines, projection histogram features in x axis and y axis, frequency domain features in x axis or y axis, and type or number or position of cross points of lines. According to one more embodiment of the present invention, a criterion of dividing the text character set in terms of the geometry or image features of text characters of the text character set may comprise geometry features, image features of the various regions, wherein each text character is segmented into p regions, and p is not less than 2.

According to the present invention, the locator character may comprise "◉", "●", "□", "▬", "★", or "■" in full-width, or "#", "+", or "=" in half-width.

According to yet another aspect of the present invention, a system of transmitting an electronic voucher through a short message is provided, which comprises: a bit stream converting unit for converting an electronic voucher to be transmitted into a bit stream; an encoding unit for mapping each n-bits of the bit stream to any one text character of one of a plurality of text character groups, wherein text characters in each of the text character groups have at least one same or similar feature, and bit number n corresponding to each text character depends on the number m of the text character groups; a character sequence formation unit for arranging the text characters obtained through the mapping into a character sequence; and a transmission unit for transmitting the character sequence through a short message. In another embodiment, the system may further comprise a code pattern formation unit for adding at least one locator character and at least one control character to the text character sequence, and adding at least one linefeed character to arrange the text character sequence into a text character code pattern, and then transmitting the text character code pattern through a short message via the transmission unit.

According to yet another aspect of the present invention, a system of acquiring an electronic voucher through a short message is provided, which comprises: a receiving unit for receiving a text character sequence through a short message; a recognition unit for recognizing features of text characters in the text character sequence in an optical manner, and determining to which one of a plurality of text character groups each text character belongs based on at least one feature of each text character, wherein text characters in each of the text character groups have at least one same or similar feature; a decoding unit for mapping each text character to bits or a bit group corresponding to the text character group determined to form a bit stream, and decoding the bit stream to obtain the content of the electronic voucher. Wherein the text character sequence may further comprise at least one locator character, at least one control character and at least one linefeed character, and the text character sequence is displayed in the form of a text character code pattern.

According to yet another aspect of the present invention, a character code comprising text characters is provided, wherein the text characters respectively belong to one of a plurality of text character groups, and text characters in each of the text character groups have at least one same or similar geometry or image feature. According to one embodiment of the present invention, the text character sequence may further comprise at least one locator character, at least one control character and at least one linefeed character, and the text character sequence is arranged into a matrix type text character code pattern. The text character groups are formed by grouping of GB2312 codes, ASCII codes, numerals and English alphabets or full-width English alphabets in terms of their geometry or image features. According to one embodiment, the locator character may comprise "⊙", "●", "□", "☰", "★", or "■" in full-width, or "#", "+", or "=" in half-width.

By the present invention, the cost of issuing an electronic voucher is greatly reduced, the convenience for users' access is greatly increased, and the users' mobile terminals have a good compatibility with this way of application. Moreover, safety and stability of the entire system are greatly enhanced, and the system is suitable for current network application environment.

BRIEF DESCRIPTION OF THE DRAWING FIGURES

In order to understand the manner in which embodiments of the present invention are obtained, a more particular description of various embodiments of the invention briefly described above will be rendered by reference to the appended drawings. Understanding that these drawings depict only typical embodiments of the invention that are not necessarily drawn to scale and are not therefore to be considered to be limited of its scope, the embodiments of the invention will be described and explained with additional specificity and detail through the use of the accompanying drawings in which:

FIG. 1 illustrates an exemplary dividing of text character groups according to one embodiment of the present invention;

FIG. 6 illustrates an exemplary character code according to one embodiment of the present invention; wherein the character code includes a code pattern which is constituted by text characters, locator characters and control characters.

DETAILED EMBODIMENTS

Figure 2:
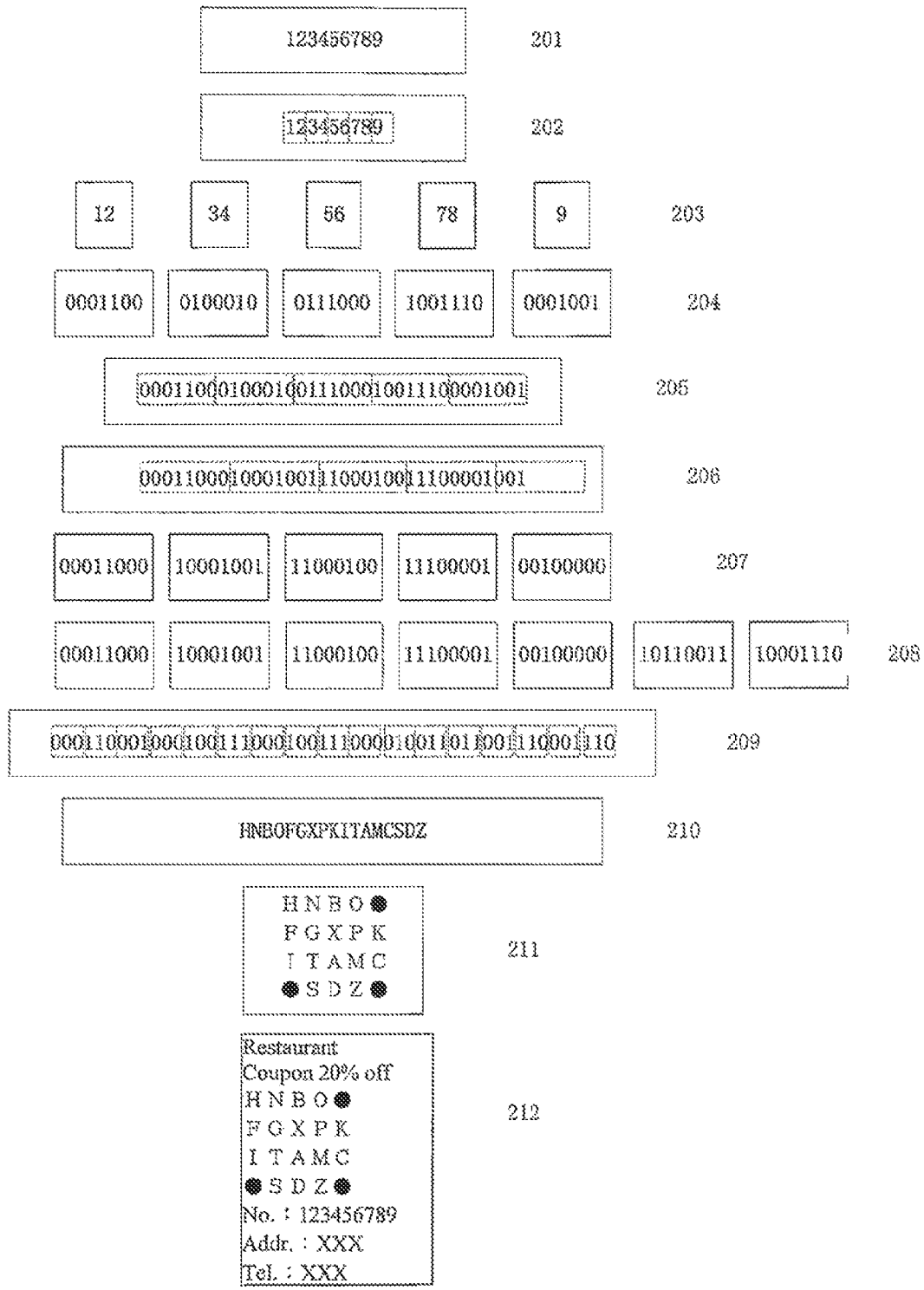
FIG. 2 illustrates an exemplary data stream of an electronic voucher transmitted through a short message according to one embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

According to the present invention, text characters are divided into a plurality of groups/categories in terms of their geometry features or image features. This method of dividing the character set to character groups will significantly reduce the CPU computational load and memory consumption when the characters are recognized, so it is more suitable to implement optical reading on a mobile terminal. The way of dividing text characters will be schematically described below with reference to FIG. 1.

Referring to FIG. 1, English alphabets are employed as a text character set for mapping bit stream groups according to one particular embodiment of the present invention. As shown in FIG. 1, all of English alphabets are divided into m (m=8) text character groups, and each of the text character groups may include a plurality of text characters. For example, text character group 1 may include English alphabets such as H, I, O, X, o, x, and text character group 5 may include English alphabets such as F, P and r. The number of characters included in each of text character groups may be equal or may be unequal (the number of characters in the text character groups as shown in this embodiment is unequal). However, the present invention is not limited in this respect.

While dividing with respect to English alphabets is shown in the drawings, those skilled in the art will appreciate that various words and symbols (in different languages) suitable for being transmitted though text short messages may be divided into m clusters in terms of their geometry features or image features. For example, the text character groups may be formed by grouping GB2312 codes, ASCII codes, numerals and English alphabets, or full-width English alphabets in terms of their geometry features or image features. According to one embodiment of the present invention, there is at least one text character group which includes two or more text characters.

According to the present invention, text characters in each of the text character groups may have same or similar geometry features or image features. According to the present invention, text characters classified in the same text character group may have at least one same or identical geometry feature, and/or have at least one same or identical image feature. Alternatively, the text characters may have at least one similar geometry feature, and/or have at least one similar image feature. For example, those characters having at least one feature which meets a certain principle of statistics, a certain principle of matching degree or other classification principles as can be figured out by those skilled in the art may be considered to have similar feature and may be classified into a same text group. For instance, text characters in a text character group may include both strictly lateral symmetry characters, and may also include characters of which the degree of lateral symmetry reaches to a criterion (such as 80%). The criterion may be adjusted as required.

In one embodiment, text characters in a text character set may be divided in terms of the text characters' axial symmetry and rotation symmetry. In another embodiment, the text character set is divided in terms of one or a combination of: number or proportion of dark spots, dispersion of dark spots, number of lines, type of lines, projection histogram features in x axis and y axis, frequency domain features in x axis or y axis, and type or number or position of cross points of lines. In other embodiment, firstly each of the text characters may be segmented into p (p≥2) regions, then the text characters are grouped based on the geometry features, image features of the various regions. Those skilled in the art may arbitrarily combine the above exemplary criteria of dividing text character groups, or may think of other criteria of dividing. The present invention is not limited in this respect. As shown in FIG. 1, in this embodiment, English alphabet H, I, O, X, o, x included in character group 1 are of longitudinal Symmetry (up-down symmetry) and lateral symmetry (left-right symmetry) image and geometry features, and English alphabet N, S, Z, s and z included in character group 7 are not of longitudinal symmetry and lateral symmetry features, but are of image and geometry features with same or similar vertical and horizontal mirror images.

By grouping text characters in terms of image and/or geometry features of the text characters, the computational load of optical character recognition can be reduced and the requirements for computation speed and storage capacity of recognition devices can also be lowered, so as to be suitable for widespread application.

According to one embodiment of the present invention, each text character group may correspond to one binary bit group. In a particular embodiment, the bit number n corresponding to each text character group depends on the number m of text character groups. For example, in the illustrated embodiment, as the number m of text character groups is 8 (groups), then each text character group may correspondently represent one bit group having 3 (n=3) bits. Therefore, as shown in FIG. 1, character group 1 may correspond to binary bit group "000", character group 2 may correspond to binary bit group "001", and character group 3 may correspond to binary bit group "010", and so forth.

According to the present invention and according to the corresponding relationship between each character group and each bit group, each of the characters belonging to a same character group may be mapped to the binary bit group corresponding to the character group, thus each of the characters represents the same information. For example, two completely different character sequence HBT and character sequence ICV may represent completely same information, namely, both correspond to binary bit stream "000-001-010".

Those skilled in the art should appreciate that, according to an embodiment of the present invention, there is actually a "many to one" mapping relationship between text characters and bit or bit group, which not only facilities optical recognition but also enhances information safety so as to avoid flagrant decoding and information misappropriating.

Next referring to FIG. 2, FIG. 2 shows an exemplary data stream of an electronic voucher transmitted through a short message according to one embodiment of the present invention. An electronic voucher generally has a unique voucher number. The voucher number may be a string of numerals (such as 12345678901234567890), a string of English alphabets (such as ABCDEFGHIJKLMNO) or a combination of numerals and English alphabets (such as A1BCD2E34567FG89) and so on, and the voucher number may include such information as serial number, encrypted information and scramble of the electronic voucher. In the electronic commerce business, generally, after the voucher number of an electronic voucher has been verified and authenticated by a verification server (wherein the voucher number was submitted to the verification server by the electronic voucher verification client side), corresponding business operations are performed (such as, to allow a user to pick up goods with a voucher and then invalidate the voucher).

By suitable encoding mode, the voucher number of an electronic voucher may be encoded into a bit stream. FIG. 2 illustrates a typical data stream of a numeral type voucher number. Firstly, voucher number 201 is divided with two numerals for each group to obtain grouped numeral sequence 202, namely, voucher number "123456789" is divided into "12-34-56-78-9".

Next, combinations 203 with two numerals (the minimum is 00, the maximum is 99) may be respectively mapped to the 0000000~1100011 portion (corresponding decimal space is 00~99) of binary space 0000000~1111111 (corresponding decimal space is 0~($2^7$−1), equal to 127), such as numeral combination "12" is mapped to "0001100". Thereby, two-digit numeral sequence 203 is mapped into seven digit binary sequence 204. Certainly, those skilled in the art can appreciate that only a kind of simple mapping mode is shown herein, whereas there are also many similar mapping modes may achieve the same object: such as making combinations with three numerals (the minimum is 000, the maximum is 999) be mapped to binary space 0000000000~1111100111 (corresponding decimal space is 000~999).

Then, the seven-digit binary sequence 204 is combined into a bit stream 205, and the bit stream 205 may be divided into code words. In the illustrated embodiment, each code word includes 8 bits. Certainly, those skilled in the art can appreciate that the code word may also include other bits, such as 4 bits, 6 bits etc. A code word stream 207 is obtained by performing filling for the code word stream 206. At this moment, extra code words may be obtained by checking, error correcting, encrypted algorithm, and the extra code words together with the code word stream 207 form an encoded code word stream 208.

Although some commonly used processing for a binary sequence is described herein, such as dividing a bit stream into a code word stream, filling a bit stream, applying checking, error correcting, encrypted algorithm and the like for the bit stream. However, as appreciated by those skilled in the art, the present invention can also be implemented without these processing, or those skilled in the art can also add additional processes according to the needs of applications. The present invention is not limited in this respect.

Next, the encoded code word stream 208 may be split, with each n bits for a bit group. As previously mentioned, bit number n of the split bit groups depends on the number m of the text character groups. In the illustrated embodiment, the encoded code word stream 208 is split, with each 3 bits for a bit group, and these bit groups form bit group stream 209.

At this moment, according to predetermined mapping scheme between the text character groups and the bit groups, the bit group stream 209 is mapped into a character sequence 210. When the bit groups are mapped into characters, any characters in the same character group all represent the same information, such as character H, I, O and X all represent the same information. Specifically, with respect to the bit group "000", one character may be arbitrarily selected from the character group 1 as shown in FIG. 1. By mapping, the character sequence 210 as shown in FIG. 2 is obtained. Certainly, those skilled in the art can appreciate that, according to the present invention, with respect to the same bit group stream 209, there may be various different character sequences 210.

Next, at least one locator character, at least one control character and/or at least one linefeed character may be added into the character sequence 210, to form a matrix type character code 211. According to one embodiment, auxiliary explanation and description information may also be added at the head and/or end of the character code 211, so as to form a text short message 212. As will be appreciated by those skilled in the art, any one character or symbol which can be sent by a text short message may all act as a locator character and/or a control character. In other embodiment, it may not need to add auxiliary information, or it may need to add other contents to form a text short message 212. The present invention is not limited in this respect.

The text short message as generated above may then be issued to a user's mobile terminal, so as to achieve the object of safely and conveniently transmitting an electronic voucher by the way of text short message. By the present invention, the cost of issuing an electronic voucher is greatly reduced, the convenience for users' access is greatly increased, and the users' mobile terminals have a good compatibility with this way of application. Moreover, safety and stability of the entire system are greatly enhanced, and the system is suitable for current network application environment.

Figure 3:
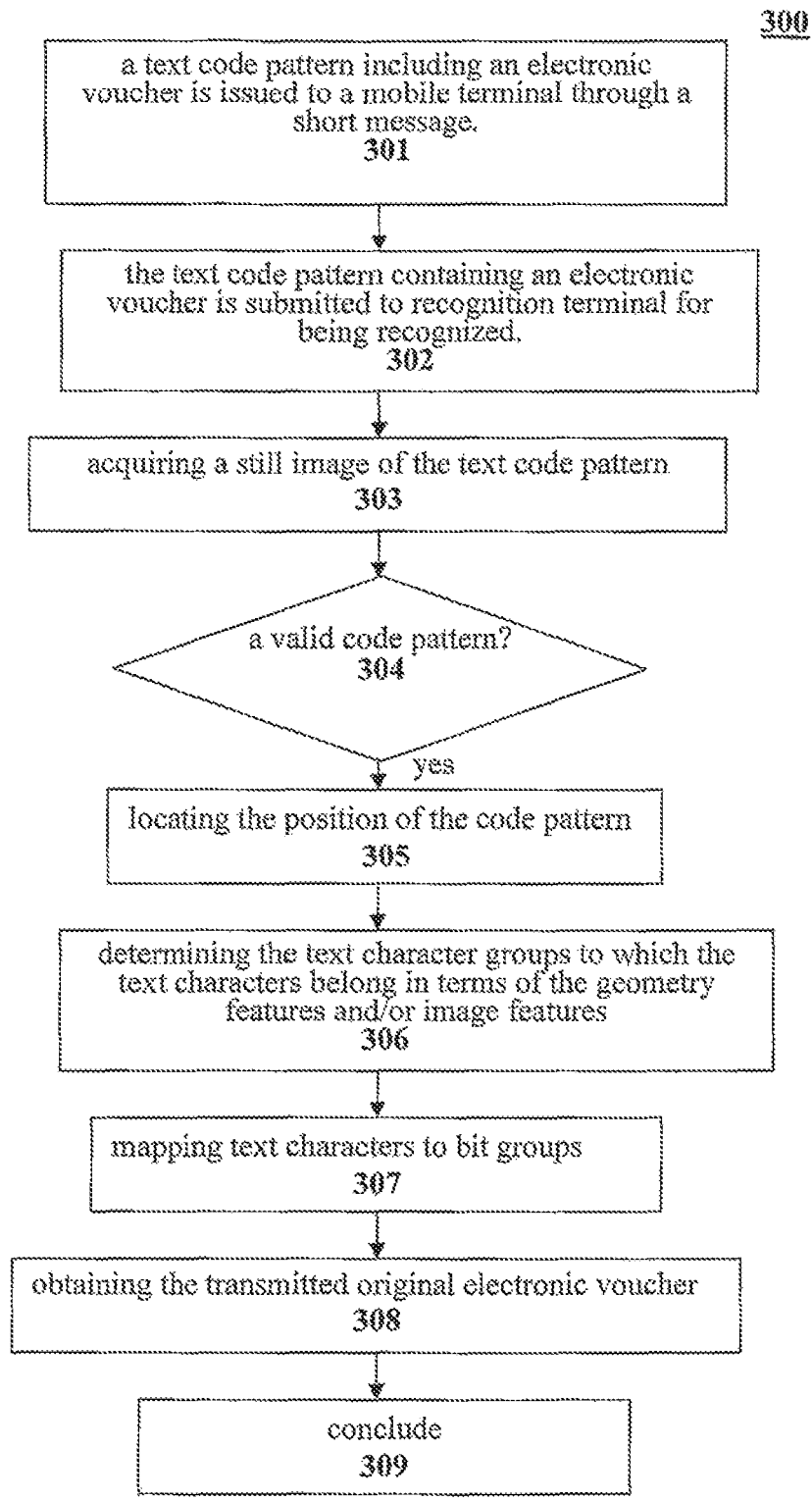
FIG. 3 illustrates a flow diagram to acquire an electronic voucher through a short message according to one embodiment of the present invention.

Next referring to FIG. 3, FIG. 3 shows a flow diagram 300 of acquiring an electronic voucher through a short message according to one embodiment of the present invention. Firstly, a text code pattern containing an electronic voucher is issued to a mobile terminal by the way of short message 301. When a user needs to use the electronic voucher, the user may display the above text code pattern containing the electronic voucher onto a recognition terminal, so as to submit the above text code pattern to the recognition terminal for recognition 302. The recognition terminal may have image acquiring devices such as a USB-camera, a camera and the like to acquire a still image of the text code pattern 303. The still image acquired by the image acquiring devices is transmitted to a recognition device, the recognition device may sense whether a locator character exists in the image, so as to determine whether the image is a valid code pattern 304, and locate the position of the code pattern 305. In one embodiment, after the position of the code pattern is located, if necessary, the image may also be transformed in order to retrieve an accurate image from its transfigurations due to perspective transformation and/or rotation. However, the present invention is not limited in this respect. Because the quality of a still image acquired by the image acquiring devices is different, the still image possibly further needs to be pretreated, wherein the methods of pretreating the image include, but not limited to, denoising, filtering, gray scaling, binarization and the like.

As those skilled in the art will appreciate, the number of locator characters may be any number of texts or symbols suitable for being sent by a short message, and the control information of a code pattern may be stored any position in the code pattern. The control information may include, but not limited to, the number m of character groups, error correcting level, edition information and the like.

Then, the recognition device may segment a character area from the image using image segmentation technology or other technical means, and then achieve the separated blocks corresponding respectively to all characters within the area and determine the text character groups to which the characters belong in terms of the geometry features and/or image features of the blocks 306. In one embodiment, the recognition device may acquire the matching possibility between each image block and each character, so as to determine the character matching with each image block by applying a suitable algorithm based upon these matching records, and then determine the text character group to which the determined character belongs in terms of the geometry features or image features of the determined character. In other embodiments, the recognition device may simply determine the text character group to which each character belongs without determining the characters. The recognition device transmits the recognition information to an encoding device, and then the encoding device may perform decoding in terms of the control information included in a character sequence. Specifically, the encoding device may map the text characters to bit groups 307 corresponding to the determined character groups according to the recognition information. In one embodiment, bit groups may also be split into code words to form a code word stream to which checking, decryption or error correcting operation may be applied. As described above, the present invention may also be achieved without these processes, or additional processes may be added by those skilled in the art according to requirements of applications. However, the present invention is not limited in this aspect. As such, the encoding device may obtain the transmitted original electronic voucher 308 according to the obtained bit stream. Thereby, the flow 300 of acquiring the electronic voucher by a short message concludes 309.

As those skilled in the art will appreciate, although the present disclosure is described and illustrated in the form of text code pattern, the present invention is not so limited by. An electronic voucher may be directly sent and received through a text character sequence, the text character sequence may include or may not include any one of a locator character, a control character or a linefeed character or their combination. Alternatively, an electronic voucher may be sent in the form of a text character sequence, while the received text character sequence may be displayed in the form of a matrix type code pattern on a mobile terminal. The applicant of the present invention anticipates that there are also other variations and these variations all fall within the scope of the present invention.

Although the various embodiments are described herein using flow chart and/or state diagram, the present invention is not limited in these drawing and corresponding descriptions herein. For example, the flow does not need to be performed via every illustrated block or state, or strictly performed in the order herein illustrated or described. Moreover, other operations may also be added into the flow.

Figure 4:
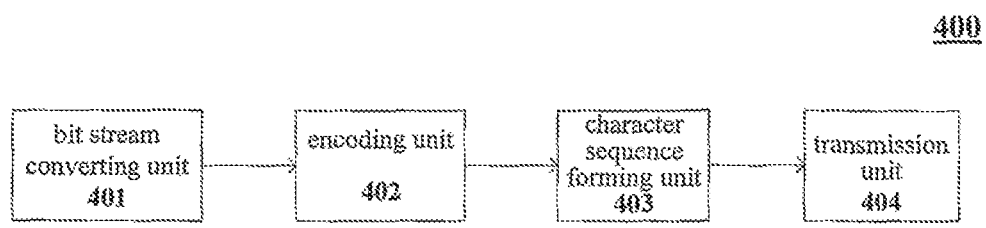
FIG. 4 illustrates an exemplary system of transmitting an electronic voucher through a short message according to one embodiment of the present invention.

Next referring to FIG. 4, FIG. 4 shows an exemplary system of transmitting an electronic voucher through a short message according to one embodiment of the present invention. As shown in the Figure, a transmitting system 400 of an electronic voucher includes a bit stream converting unit 401, an encoding unit 402, a character sequence forming unit 403 and a transmission unit 404. Wherein, a bit stream converting unit 401 is used for converting an electronic voucher into a bit stream. As those skilled in the art will appreciate, the converting method may involve directly converting the electronic voucher, and may also involve converting the electronic voucher after encrypting it. The encoding unit 402 is used for mapping each n-bits of the bit stream to any one character in one text group of a plurality of text character groups. As previously described, text characters in each of the text groups have at least one same or similar feature, and the bit number n corresponding to each text character depends on the number m of the text groups. As such, a text character sequence may be obtained. The character sequence forming unit 403 is used for arranging the text characters into a text character sequence. The transmission unit 404 is used for transmitting the obtained text character sequence through a short message. According to one embodiment of the present invention, the way of transmitting a short message includes, but not limited to, point-to-point short message, batch-sending short messages by setting up long connection with a short message gateway. Moreover, as mentioned above, the character sequence may be sent in the form of a code pattern, in this embodiment the system may also include a code pattern forming unit (not shown) for adding a locator character and/or a control character into the obtained text character sequence, and adding a linefeed character to arrange the character sequence into a text character code pattern.

Figure 5:
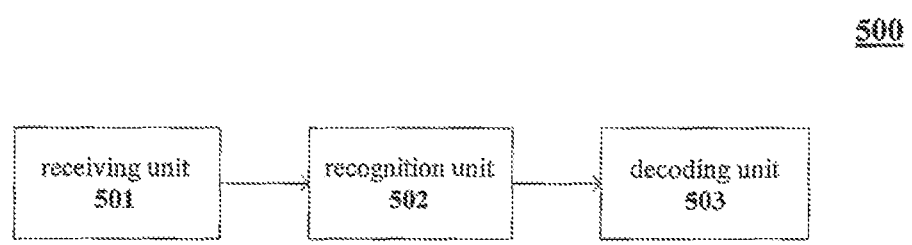
FIG. 5 illustrates an exemplary system of acquiring an electronic voucher through a short message according to one embodiment of the present invention.

FIG. 5 shows an exemplary system of acquiring an electronic voucher through a short message according to one embodiment of the present invention. As shown in the Figure, an acquiring system 500 of an electronic voucher includes a receiving unit 501, a recognition unit 502 and a decoding unit 503. Wherein, a receiving unit 501 for receiving a text character sequence through a short message; a recognition unit 502 for recognizing features of text characters in the text character sequence in an optical manner, and determining to which one of a plurality of text character groups each text character belongs based on at least one feature of each text character, wherein text characters in each of the text character groups have at least one same or similar feature; a decoding unit 503 for receiving the recognition information that recognition unit 502 generated and mapping each text character to bits or a bit group corresponding to the text character group determined to form a bit stream, and decoding the bit stream to obtain the content of the electronic voucher.

Those skilled in the art will appreciate that, a receiving unit 501, a recognition unit 502, and a decoding unit 503 could be a mobile terminal, a fixed terminal, or a constituent part of a mobile terminal or a fixed terminal.

Next referring to FIG. 6, FIG. 6 shows exemplary character codes according to one embodiment of the present invention, which include character code patterns with text characters, locator characters, and control characters. Those skilled in the art will appreciate that the displayed form of a code pattern varies with the character set used, locator characters, control characters and the arrangement formats. For example, code pattern 601 is a character code pattern using character "●" as locator characters, where the character sequence is arranged in a matrix type by linefeed characters; Code pattern 602 is a code pattern which is formed by adding business illustration, description information of the electronic voucher on the basis of the code pattern 601. Code pattern 603 is an exemplary code pattern which does not use locator character or linefeed character but is automatically line fed by terminal screen, where the text character sequence is directly arranged in one-dimensional mode to form code pattern. Code pattern 604 is an exemplary code pattern that does not use locator character or linefeed character but is automatically line fed by terminal screen, which takes "=" as locator character to define the start/stop positions of the text character string. Code pattern 605 is an exemplary code pattern that takes "☺" as locator characters to define the start/stop positions of each row, where the text sequence is arranged in two-dimensional matrix after being line fed by linefeed characters. Code pattern 606 is an exemplary code pattern which is formed by being arranged in two-dimensional matrix after the text sequence is line fed by linefeed characters. Code pattern 606 does not use locator character. The skilled in the art can appreciate that a locator character or a control character can be any text or character which could be sent through a short message.

Although several exemplary character codes are shown in FIG. 6, these skilled in the art should appreciate that, the character codes of the present invention are not limited to these described in the drawings and in the specific embodiments above. These skilled in the art could have other variations and alternative embodiments without departing from the spirit and scope of the present invention, all the variations and alternative embodiments should fall within the scope of the present invention.

The present invention comprises a plurality of operations. The operations of the present invention could be implemented by hardware or be included in machine-executable content. The content could be used to enable universal or specific processor or logical circuit programmed with the instructions to perform the operations. Alternatively, the operation could be implemented by combination of hardware and software. Besides, although the present invention has been described in context of a computing apparatus, these skilled in the art would realize that such function could be properly implemented by any one of the alternative embodiments.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions. The terms and expressions which have been employed herein are used as terms of description and not of limitation, and there is no intention, in the use of such terms and expression, of excluding any equivalents of the features shown and described (or portions thereof), and it is recognized that various modifications, variations, alternatives, and equivalents are possible within the scope of the claims. Accordingly, the claims are intended to cover all such modifications, variations, alternatives, and equivalents.

What is claimed is:

1. A method of transmitting an electronic voucher through a short message, the method which comprises:
converting an electronic voucher to be transmitted into a bit stream;
mapping each n-bits of the bit stream to any one text character of one of a plurality of text character groups, wherein text characters in each of the text character groups have at least one same or similar geometry or image feature, and a bit number n corresponding to each text character depends on a number m of the text character groups;

arranging the text characters obtained by the mapping into a character sequence; and transmitting the character sequence through a short message;

wherein, the plurality of text character groups are achieved by dividing a text character set in terms of the geometry or image features of the text characters of the text character set; and a criterion of dividing the text character set in terms of the geometry or image features of the text characters of the text character set includes: axial symmetry and rotational symmetry of the text characters.

2. The method according to claim 1, which further comprises, prior to the step of mapping, forming a code word stream after encoding and adding an error correcting code stream to the bit stream.

3. The method according to claim 1, which further comprises adding at least one locator character and at least one control character to the text character sequence, and adding at least one linefeed character to arrange the text character sequence into a text character code pattern, and then transmitting the text character code pattern through the short message.

4. The method according to claim 1, wherein at least one text character group of the plurality of text character groups include two or more text characters.

5. The method according to claim 1, wherein the text character groups are formed by grouping GB2312 codes, ASCII codes, numerals and English alphabets or full-width English alphabets in terms of their geometry or image features.

6. The method according to claim 1, wherein the text character set is divided into m text character groups in terms of a geometry or image features of the text characters of the text character set, and wherein m is not less than 2.

7. The method according to claim 6, wherein a criterion of dividing the text character set in terms of the geometry or image features of text characters of the text character set comprises one or a combination of:
a number or proportion of dark spots;
a dispersion of dark spots;
a number of lines;
a type of lines;
projection histogram features in x axis and y axis;
frequency domain features in x axis or y axis; and
a type or number or position of cross points of lines.

8. The method according to claim 6, wherein a criterion of dividing the text character set in terms of the geometry or image features of text characters of the text character set comprises:
geometry features, image features of the various regions, wherein each text character is segmented into p regions, and p is not less than 2.

9. The method according to claim 1, which further comprises adding at least one locator character to the text character sequence, the locator character comprising "☉", "●", "□", ""▬"",", "★", or "■" in full-width, or "#", "+", or "=" in half-width.

10. A method of acquiring an electronic voucher from a short message, the method which comprises:
receiving a text character sequence through a short message;

recognizing features of text characters in the text character sequence in an optical manner, and determining to which one of a plurality of text character groups each text character belongs based on at least one feature of each text character, wherein text characters in each of the text character groups have at least one same or similar geometry or image feature;

mapping each text character to bits or a bit group corresponding to the text character group determined to form a bit stream; and decoding the bit stream to acquire a content of the electronic voucher;

wherein, the plurality of text character groups are achieved by dividing a text character set in terms of the geometry or image features of the text characters of the text character set; and a criterion of dividing the text character set in terms of the geometry or image features of the text characters of the text character set includes: axial symmetry and rotational symmetry of the text characters.

11. The method according to claim 10, wherein the text character sequence further comprises at least one locator character, at least one control character, and at least one linefeed character, and the text character sequence is displayed in the form of a text character code pattern.

12. The method according to claim 10, wherein the text character set is divided into m text character groups in terms of the geometry or image features of the text characters of the text character set, wherein m is not less than 2.

13. The method according to claim 12, wherein a criterion of dividing the text character set in terms of the geometry or image features of text characters of the text character set comprises one or a combination of:
a number or proportion of dark spots;
a dispersion of dark spots;
a number of lines;
a type of lines;
projection histogram features in x axis and y axis;
frequency domain features in x axis or y axis; and
a type or number or position of cross points of lines.

14. The method according to claim 12, wherein a criterion of dividing the text character set in terms of the geometry or image features of text characters of the text character set comprises:
geometry features, image features of the various regions, wherein each text character is segmented into p regions, and p is not less than 2.

15. The method according to claim 10, wherein the text character sequence further comprises at least one locator character selected from the group consisting of "☉", "●", "□", ""▬"",", "★", and "■" in full-width, or "#", "+", and "=" in half-width.

16. A system for transmitting an electronic voucher through a short message, comprising:
a bit stream converting unit for converting an electronic voucher to be transmitted into a bit stream;
an encoding unit, connected to said bit stream converting unit, for mapping each n-bits of the bit stream to any one text character of one of a plurality of text character groups, wherein text characters in each of the text character groups have at least one same or similar geometry or image feature, and a bit number n corresponding to each text character depends on a number m of the text character groups;

a character sequence formation unit, connected to said encoding unit, for arranging the text characters obtained through the mapping into a character sequence; and a transmission unit, connected to said character sequence formation unit, for transmitting the character sequence through a short message;

wherein, the plurality of text character groups are achieved by dividing a text character set in terms of the geometry or image features of the text characters of the text character set; and a criterion of dividing the text character set in terms of the geometry or image features of the text characters of the text character set includes: axial symmetry and rotational symmetry of the text characters.

17. The system according to claim 16, further comprising a code pattern formation unit for adding at least one locator character and at least one control character to the text character sequence, and adding at least one linefeed character to arrange the text character sequence into a text character code pattern, and then transmitting the text character code pattern through a short message.

18. A system of acquiring an electronic voucher through a short message, comprising:

a receiving unit for receiving a text character sequence through a short message;

a recognition unit, connected to said receiving unit, for recognizing features of text characters in the text character sequence in an optical manner, and determining to which one of a plurality of text character groups each text character belongs based on at least one feature of each text character, wherein text characters in each of the text character groups have at least one same or similar geometry or image feature;

a decoding unit, connected to said recognition unit, for mapping each text character to bits or a bit group corresponding to the text character group determined to form a bit stream, and decoding the bit stream to obtain the content of the electronic voucher wherein, the plurality of text character groups are achieved by dividing a text character set in terms of the geometry or image features of the text characters of the text character set; and a criterion of dividing the text character set in terms of the geometry or image features of the text characters of the text character set includes: axial symmetry and rotational symmetry of the text characters.

19. The system according to claim 18, wherein the text character sequence further comprises at least one locator character, at least one control character and at least one linefeed character, and the text character sequence is displayed in the form of a text character code pattern.

* * * * *